US011050835B2

(12) United States Patent
Delaney et al.

(10) Patent No.: US 11,050,835 B2
(45) Date of Patent: Jun. 29, 2021

(54) GENERATING CONTEXTUAL USER RESPONSES

(71) Applicant: INTERNATIONAL BUSINESS MACHINES CORPORATION, Armonk, NY (US)

(72) Inventors: Mark Delaney, Raleigh, NC (US); Brett Ward, Raleigh, NC (US); Liam S. Harpur, Skerries (IE); Robert H. Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/144,180

(22) Filed: Sep. 27, 2018

(65) Prior Publication Data

US 2020/0106841 A1 Apr. 2, 2020

(51) Int. Cl.
*G06F 15/16* (2006.01)
*H04L 29/08* (2006.01)
*H04W 4/12* (2009.01)
*G06F 21/31* (2013.01)

(52) U.S. Cl.
CPC ............ *H04L 67/22* (2013.01); *G06F 21/316* (2013.01); *H04L 67/12* (2013.01); *H04L 67/24* (2013.01); *H04L 67/306* (2013.01); *H04W 4/12* (2013.01)

(58) Field of Classification Search
CPC ......... H04L 67/22; H04L 67/12; H04L 67/24; H04L 67/306; G06F 21/316; H04W 4/12
USPC ........................................ 709/219, 206, 224
See application file for complete search history.

(56) References Cited

U.S. PATENT DOCUMENTS

| | | | |
|---|---|---|---|
| 7,334,021 B1 | 2/2008 | Fletcher | |
| 9,239,987 B1* | 1/2016 | Tsao | ................... G06F 16/24578 |
| 9,648,115 B2 | 5/2017 | Granito | |
| 9,667,572 B2 | 5/2017 | Heikes et al. | |
| 9,805,371 B1 | 10/2017 | Sapoznik et al. | |
| 9,954,806 B2 | 4/2018 | Claux et al. | |
| 9,979,826 B1 | 5/2018 | Hadju et al. | |
| 9,986,052 B1 | 5/2018 | Zuo et al. | |
| 9,986,379 B2 | 5/2018 | Gerken | |
| 2003/0014491 A1* | 1/2003 | Horvitz | ................ G06Q 10/109 709/206 |
| 2004/0199663 A1* | 10/2004 | Horvitz | ................ G05B 19/404 709/238 |
| 2005/0055413 A1 | 3/2005 | Keohane et al. | |

(Continued)

OTHER PUBLICATIONS

Kannan et al., "Smart Reply: Automated Response Suggestion for Email", KDD '16 22nd ACM SIGKDD International Conference on Aug. 13-17, 2016, pp. 955-964.

(Continued)

*Primary Examiner* — Kaylee J Huang
(74) *Attorney, Agent, or Firm* — Cantor Colburn LLP; Tihon Poltavets

(57) ABSTRACT

Methods, systems, and computer program products for internet of things (IoT) network context dependent communication responses are provided. Aspects include receiving, by a processor, a communication request for a user, obtaining IoT network contextual data for one or more IoT network devices, determining a user context based at least in part on the IoT network contextual data, and generating a response to the communication request based on the user context.

17 Claims, 6 Drawing Sheets

(56) References Cited

U.S. PATENT DOCUMENTS

| | | | | |
|---|---|---|---|---|
| 2006/0258368 A1* | 11/2006 | Granito | | G01C 21/00 455/456.1 |
| 2007/0275698 A1* | 11/2007 | Kuiken | | H04M 1/57 455/414.1 |
| 2009/0047933 A1 | 2/2009 | Spitzer | | |
| 2009/0234909 A1* | 9/2009 | Strandell | | H04L 67/22 709/203 |
| 2013/0225134 A1* | 8/2013 | Earnshaw | | H04M 3/533 455/413 |
| 2014/0004889 A1* | 1/2014 | Davis | | H04W 4/12 455/466 |
| 2014/0237057 A1* | 8/2014 | Khodorenko | | H04L 51/32 709/206 |
| 2014/0280243 A1* | 9/2014 | Lee | | G06Q 10/10 707/751 |
| 2015/0213355 A1* | 7/2015 | Sharma | | G06F 3/017 706/11 |
| 2016/0291671 A1* | 10/2016 | Rider | | G06F 1/3231 |
| 2017/0104863 A1* | 4/2017 | Turim | | H04L 51/38 |
| 2018/0052909 A1 | 2/2018 | Sharifi et al. | | |
| 2018/0109476 A1 | 4/2018 | Braun et al. | | |
| 2018/0288211 A1* | 10/2018 | Kim | | H04L 51/02 |
| 2018/0348844 A1* | 12/2018 | Lingutla | | G06F 1/3231 |
| 2019/0012902 A1* | 1/2019 | Kumar | | H04L 67/26 |
| 2019/0159166 A1* | 5/2019 | Aggarwal | | H04W 4/029 |

OTHER PUBLICATIONS

Resig et al., "A Framework for Mining Instant Messaging Services", SIAM DM Conference, 2004, pp. 1-8.

Van Kleek et al., "Atomate It! End-User Context-Sensitive Automation Using Heterogeneous Information Sources on the Web", WWW '10 ACM 19th Inter. Conf. On Apr. 26-30, pp. 951-960.

Tapia et al., "Activity Recognition in the Home Using Simple and Ubiquitous Sensors", Pervasive Computing, LNCS 3001, Mar. 2004, 18 pages.

* cited by examiner

GENERATING CONTEXTUAL USER RESPONSES

BACKGROUND

The present invention generally relates to the Internet of Things (IoT), and more specifically, to generating a user response based on IoT network context.

With the advancement of communication technology, individuals are even more connected to each other than in the past. With this increase in connectivity, often it can be difficult to manage responses to contacts when an individual is caught up in another activity. Often, people may get offended if you appear to be ignoring them when they attempt to contact you. However, when an individual is actively engaged in other activities, it can be difficult to switch gears and attempt to respond to every contact attempt.

SUMMARY

Embodiments of the present invention are directed to a computer-implemented method for internet of things (IoT) network context dependent communication responses. A non-limiting example of the computer-implemented method includes receiving, by a processor, a communication request for a user, obtaining IoT network contextual data for one or more IoT network devices, determining a user context based at least in part on the IoT network contextual data, and generating a response to the communication request based on the user context.

Embodiments of the present invention are directed to a system for internet of things (IoT) network context dependent communication responses. A non-limiting example of the system includes a processor coupled to a memory, the processor configured to perform a method include receiving, by a processor, a communication request for a user, obtaining IoT network contextual data for one or more IoT network devices, determining a user context based at least in part on the IoT network contextual data, and generating a response to the communication request based on the user context.

Embodiments of the invention are directed to a computer program product for internet of things (IoT) network context dependent communication responses, the computer program product comprising a computer readable storage medium having program instructions embodied therewith. The program instructions are executable by a processor to cause the processor to perform a method. A non-limiting example of the method includes receiving, by a processor, a communication request for a user, obtaining IoT network contextual data for one or more IoT network devices, determining a user context based at least in part on the IoT network contextual data, and generating a response to the communication request based on the user context.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
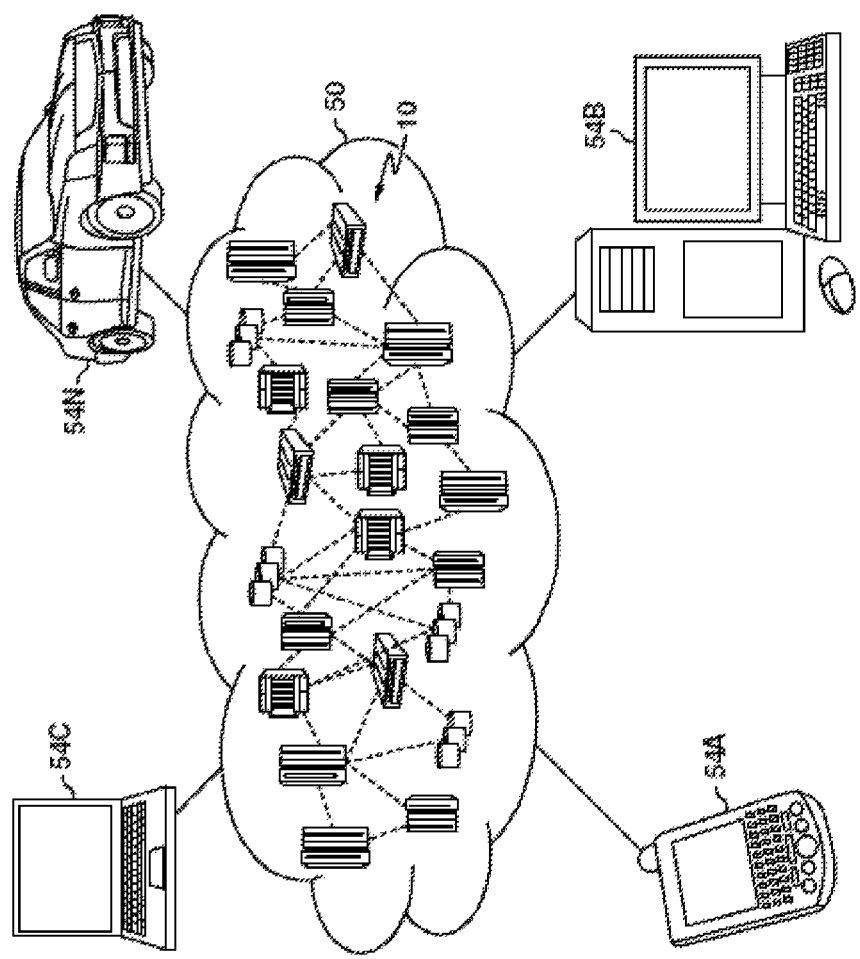
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
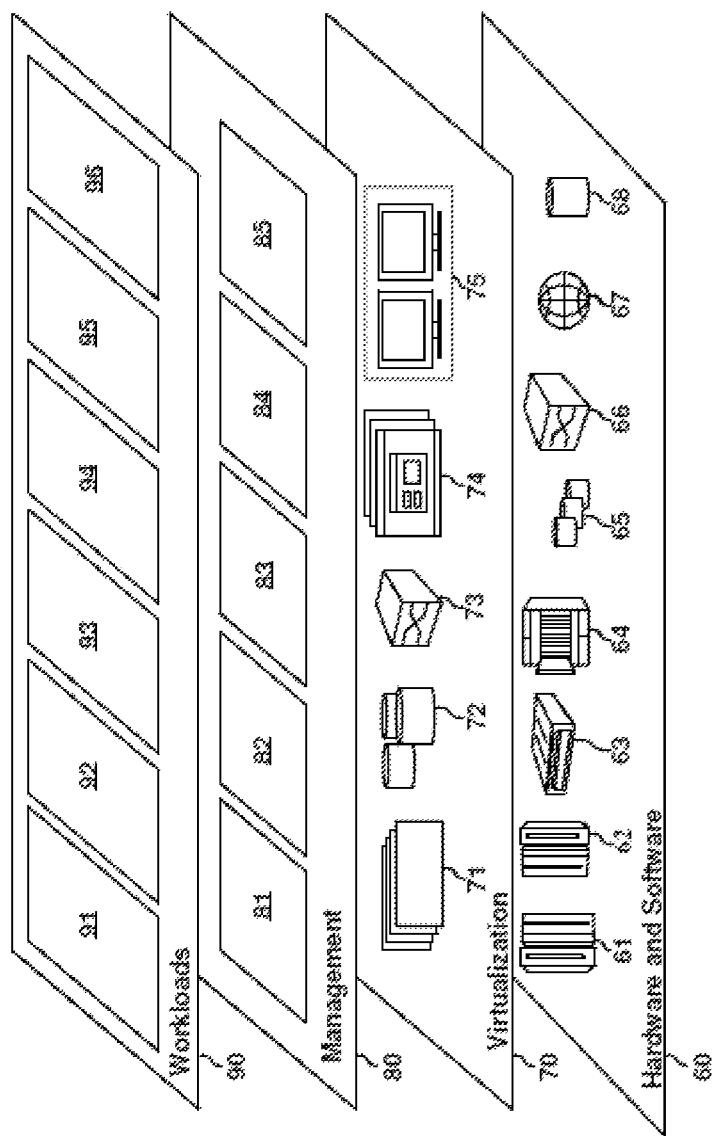
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating responses based on IoT network context for a user 96.

Figure 3:
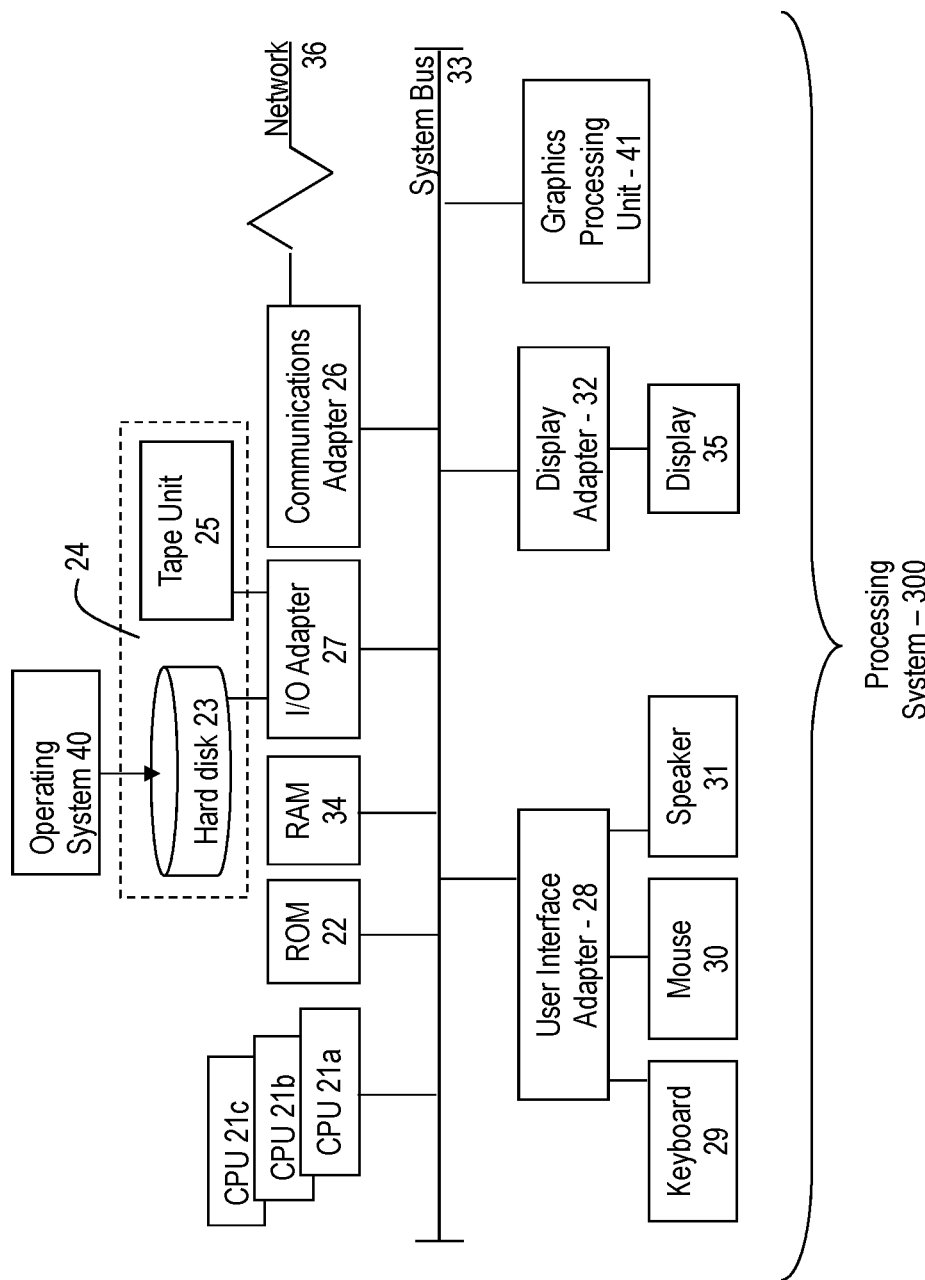
FIG. 3 depicts a block diagram of a computer system for use in implementing one or more embodiments of the present invention.
Figure 4:
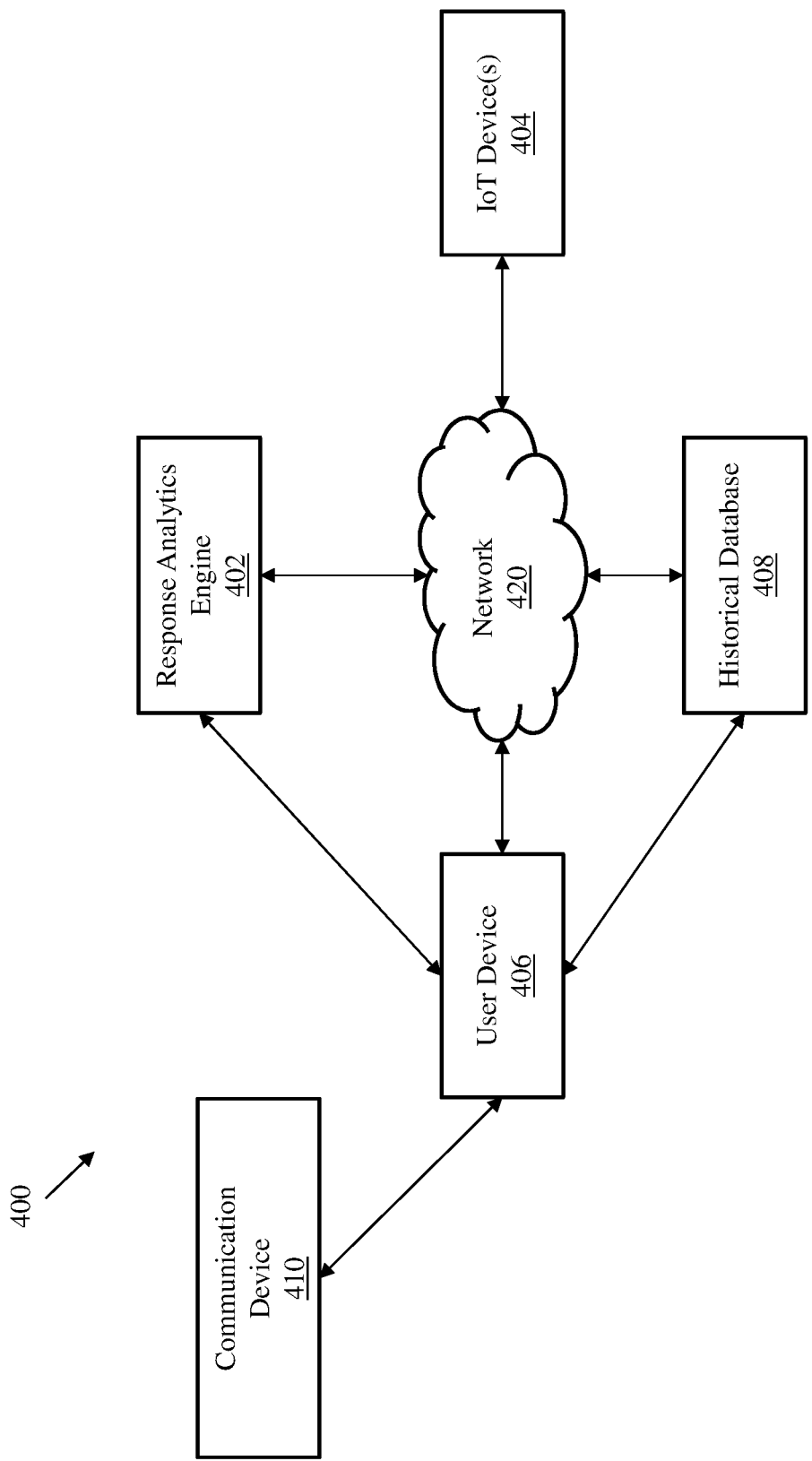
FIG. 4 depicts a block diagram of a system for internet of things (IoT) network context dependent communication responses according to one or more embodiments of the invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, away messages or communication request replies can help communicate a status of an individual trying to be reached by another individual. However, most away message applications tend to be related to location-based messaging. With the increase in smart devices, such as IoT devices which are connected to a wireless or wired network, a need is required to generate an away message or message reply to a communication request by leveraging an IoT mesh network to capture an individual's specific and dynamic away message.

Turning now to an overview of the aspects of the invention, one or more embodiments of the invention address the above-described shortcomings of the prior art by providing a system for generating away messages and replies that are specific to a user's contextual situation. The user's contextual situation can be determined from the status of the user's IoT network devices at the time the user receives a communication request. As utilized herein, the term "communication request" can include, but is not limited to, a phone call to the user's phone, a text message to the user, an email, social media posting, video conference request, chat message, and the like. Embodiments of the invention include away message generation from a user device, such as a smartphone, that informs the sender of a communication request that the user is otherwise pre-occupied and can include in the message that the user will contact the sender at a later time can provide a later time for the sender to contact the user based on anticipated availability of the user. The away message (e.g., reply) can be generated based on the statuses of the IoT device along with metadata associated with the IoT devices that indicate how the user is interacting at the IoT device at or around the time of the communication request.

Turning now to a more detailed description of aspects of the present invention, FIG. X depicts a system for internet of things (IoT) network context dependent communication responses according to embodiments of the invention. In embodiments of the invention, the system 400 includes a response analytics engine 402 that is in electronic communication with a user device 406. The analytics engine 402 can be stored on a cloud server and can communicate with the user device 406 through a network 420 or can be stored locally on the user device 406 as an application for the user device 406. The user device 406 can access one or more IoT devices 404 through a wireless or wired network 420. In embodiments of the invention, an IoT device 404 mesh network can be created that are connected to a home or commercial wireless network. The IoT device 404 can share information about each IoT device 404 such as status data (e.g., busy, idle, in use) as well as metadata that can include information about the status data. For example, an IoT oven can share usage data that includes the temperature of the oven, how long the oven has been on or off, the number of times the oven door has been opened over a period of time, the location of the oven with respect to the user device 406, and the like.

In embodiments of the invention, the term Internet of Things (IoT) device is used herein to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT objects may include, but are not limited to, refrigerators, toasters, ovens, microwaves, freezers, dishwashers, dishes, hand tools, clothes washers, clothes dryers, furnaces, heating, ventilation, air conditioning & refrigeration (HVACR) systems, air conditioners, thermostats, fire alarm & protection system, fire, smoke & CO detectors, access/video security system, elevator and escalator systems, burner and boiler controls, building management controls, televisions, light fixtures, vacuum cleaners, sprinklers, electricity meters, gas meters, etc., so long as the devices are equipped with an addressable communications interface for communicating with the IoT network. IoT objects may also include cell phones, desktop computers, laptop computers, tablet computers, personal digital assistants (PDAs), etc. Accordingly, the IoT network can include a combination of "legacy" Internet-accessible devices (e.g., laptop or desktop computers, cell phones, etc.) in addition to devices that do not typically have Internet-connectivity (e.g., dishwashers, etc.).

In one or more embodiments of the invention, the user device 406 can be configured to receive a communication request from a communication device 410 such as another individual's phone, computer, tablet, and the like. The communication request is transmitted to and received by the user device 406. Data associated with the communication request can be transmitted to the response analytics engine 402 for processing. The data associated with the communication request can include the identity of the sender of the communication request, the text or payload of the communication request, audio or video data associated with the communication request, and metadata associated with the communication request. The data associated with the communication request can be transmitted to the response analytics engine 402 which in turn can obtain IoT network contextual data for the IoT devices 404. The IoT network contextual data includes metadata for the IoT devices 404 which can include status, operational, and non-operational data associated with the IoT device 404 as well as historical data associated with the IoT device 404 such as, for example, when the last time the IoT device 404 was in use and for how long.

In one or more embodiments of the invention, the response analytics engine 402, based on the available data, can determine a context of a user of the user device 406 and generate an appropriate reply message or away message for the user to respond to the communication request from an outside communication device 410. The context of the user can be determined based on the current status of the IoT devices 404 as well as the historical context of the IoT devices. These patterns can be utilized to predict a user's context at certain points in time or relative to certain interactions with the IoT devices 404. For example, a pattern may emerge when a user interacts with a microwave device and then two minutes later interacts with a smart television by turning it on. Around 30 minutes later, the user may interact with an IoT kettle. This type of pattern can show a certain routine of a user who might be warming up some food for dinner and then eating the food in front of the television. And after dinner, the user may be preparing tea or coffee based on this pattern. As any communication requests come into the user device 406, the response analytics engine 402 could generate an away message indicating that the user is preparing or in the middle of eating and should be available after a certain length of time. Another example pattern can be a user interacting with his/her cell phone for 50 minutes and then after interacts with their computer for 50 minutes. In these two pattern examples, the response analytics engine 402 can categorize the activity of the user during these patterns and allow for an associated score for how busy the user is. Aggregating this data across a population data, for example, could identify that for the second pattern example, the user may be engaged in a work activity and an associated score or probability can be calculated for this pattern being properly identified as a work activity, such as a 78% the user is engaged in the work activity. In this case, the probability can be compared to a threshold score or probability (e.g., above 50% engaged in certain activities), then generate an away message related to the activity. The response analytics engine 402 can generate an away message from a few sources. In embodiments, the away message can be accessed from a look-up table of responses that would give an away message to a hypothetical communication request, e.g., "User is busy working at the moment and will likely call back in 30 minutes." In other embodiments, the response analytics engine 402 can generate away messages based on the context of the communication request and/or historical away messages generated by the system 400 and/or the user. In one or more embodiments of the invention, the user can adjust certain tolerances of the confidence threshold that the user is engaged in a certain activity. The user can save these tolerances in the user profile which can be accessed by the response analytics engine 402 when determining whether to respond to a communication request with an away message.

In one or more embodiments of the invention, the identity of the sender of the communication request can be obtained by the response analytics engine 402. The identity of the sender and their relationship to the user can be utilize to generate the away message in terms of tone and sentiment in the words utilized in the away message. For example, a close friend can have a more jovial language utilized in the away message. For a business associate, a more professional language can be utilized.

In one or more embodiments of the invention, the system 400 includes a historical database 408 that can store information about the user of the user device 406, information about the IoT devices 404, and any previous interactions by the user with individual's attempting to contact the user. This information can be stored in a user profile that can be associated with specific users of the IoT devices 404. Based on the location of the user device 406 to the IoT devices 404, that user's user profile can be accessed when determining how to generate a contextual away message by the response analytics engine 402. For example, if two individuals are living in a home and an IoT television is being interacted with, the user device 406 can confirm which user is interacting with the IoT device 404 based on the proximity of their user device 406 to the IoT television. Based on the user device 406 being a certain distance from or being at a location indicating the user is not interacting with the IoT television, this IoT device 404 data would not be utilized in determining whether to and how to generate an away message for the user if they receive a communication request.

Figure 5:
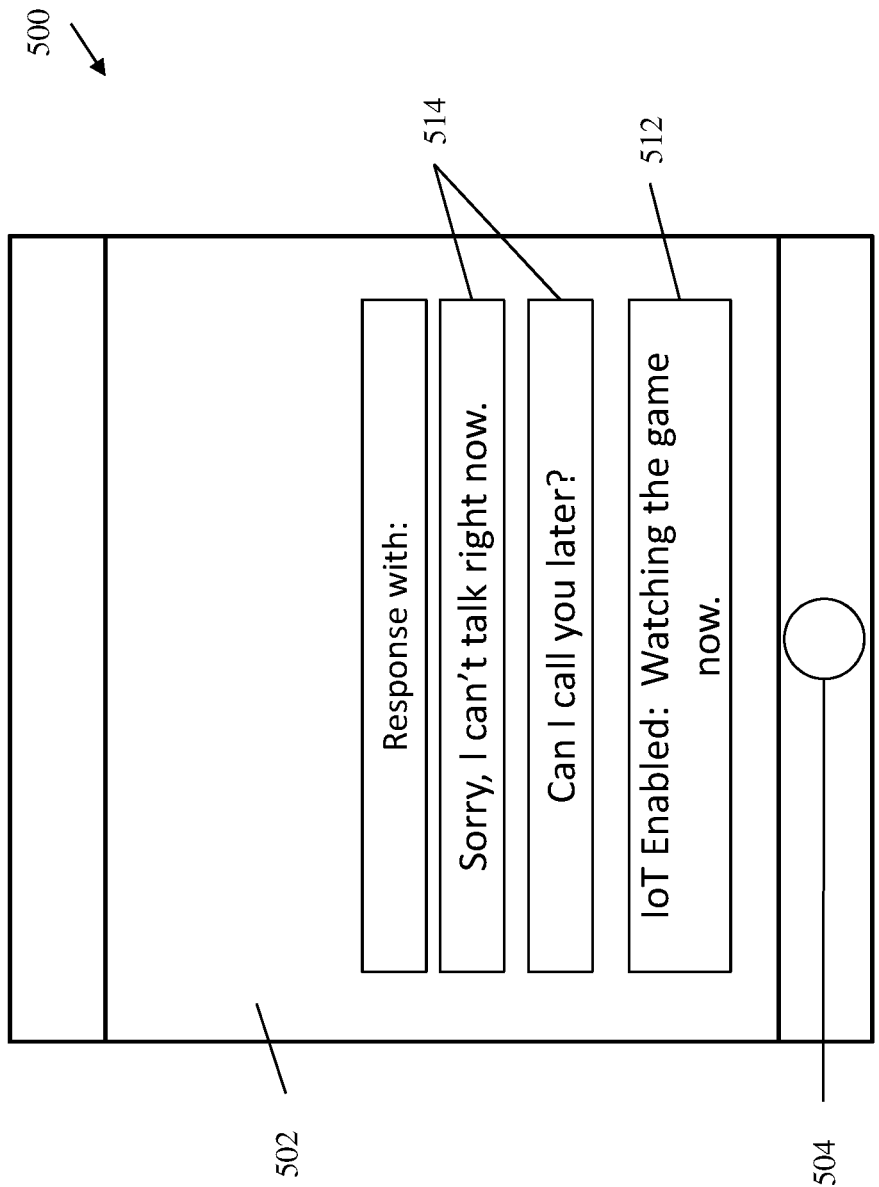
FIG. 5 depicts a block diagram of a user device display for IoT network context dependent communication responses according to one or more embodiments of the invention.

In embodiments of the invention, when the away message is generated by the response analytics engine 402, the user device 406 can automatically send the away message to the sender of the communication request. In other embodiments, the away message can be displayed to the user on the user device 406 and the user can select whether to send the away message or can select from more generic away messages. FIG. 5 depicts a block diagram of a user device display for IoT network context dependent communication responses according to one or more embodiments of the invention. The user device 500 includes a display screen 502 and a user input 504. When a contextual away message is generated, the contextual away message 512 can be displayed individually to the user on the display screen 502 or in combination with one or more generic away messages 514 for the user to select. The user can select one of the away messages 512, 514 and the user's selection can be stored in the user profile as historical data. This historical data can be utilized by the response analytics engine 402 in later away messages. In one or more embodiments, the user can suggest changes to the contextual away message 512 generated by the response analytics engine 402. These changes can be input into the user device 500 through the user input 504 and incorporated into a new away message. The changes from the user can be stored in the user profile as historical data and utilized to tune or train the response analytics engine 402.

In embodiments of the invention, the engines 402 can also be implemented as so-called classifiers (described in more detail below). In one or more embodiments of the invention, the features of the various engines/classifiers (402) described herein can be implemented on the processing system 300 shown in FIG. 3, or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In embodiments of the invention, the response analytics engine 402 can perform natural language processing (NLP) analysis techniques on the content of the communication request. For example, if the communication request is a text message to the user, the NLP analysis can analyze the textual content by parsing, syntactical analysis, morphological analysis, and other processing including statistical modeling and statistical analysis. The type of NLP analysis can vary by language and other considerations. Also, the NLP analysis can include a translation and/or interpretation of the natural language input, including synonymous variants thereof. Based on this NLP analysis, the response analytics engine 402 can determine the subject of the communication request, the sentiment or tone of the communication request, and any level of urgency to respond to the communication request which can be utilized for generating an appropriate away message from the user.

Figure 6:
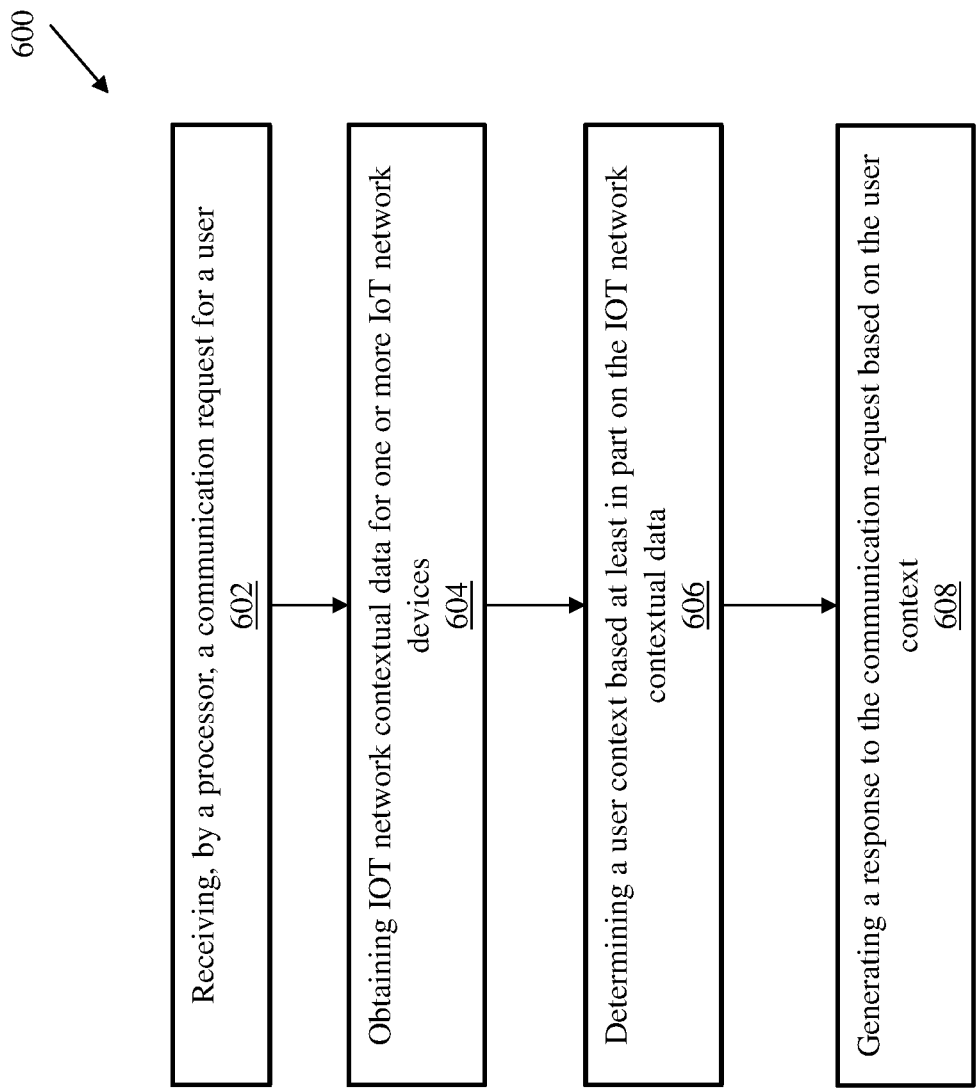
FIG. 6 depicts a flow diagram of a method for IoT network context dependent communication responses according to one or more embodiments of the invention.

FIG. 6 depicts a flow diagram of a computer-implemented method for internet of things (IoT) network context dependent communication responses according to one or more embodiments of the invention. The method 600 includes receiving, by a processor, a communication request for a user, as shown in block 602. The method 600, at block 604, includes obtaining IoT network contextual data for one or more IoT network devices. Then, the method 600 includes determining a user context based at least in part on the IoT network contextual data, as shown at block 606. And at block 608, the method 600 includes generating a response to the communication request based on the user context.

Additional processes may also be included. It should be understood that the processes depicted in FIG. 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for internet of things (IoT) network context dependent communication responses, the method comprising:
   receiving, by a processor, a communication request for a user, the communication request comprising content, wherein the communication request for the user is received at a user device for the user;
   determining an identity of a sender of the communication request;
   analyzing the content of the communication request to determine a sentiment or tone of the communication request;
   determining a responsive sentiment or a responsive tone for a response to the communication request based on the determined sentiment or the determined tone and the identity of the sender;
   identifying one or more IoT network devices based on a proximity of the user device to the one or more IoT network devices;
   obtaining IoT network contextual data for the one or more IoT network devices, wherein the IoT network contextual data comprises IoT network historical pattern data indicating one or more patterns of user interactions with the one or more IoT network devices;
   determining a user context based at least in part on the one or more patterns of user interactions with the one or more IoT network devices, wherein determining the user context comprises:
      generating a pattern score based on the IoT network historical pattern data; and
      determining the user context based at least in part on the pattern score exceeding a threshold pattern score; and
   generating the response to the communication request based on the identity of the sender and the user context by incorporating the responsive sentiment or the responsive tone into the response to the communication request.

2. The computer-implemented method of claim 1 further comprising transmitting the response to the sender of the communication request.

3. The computer-implemented method of claim 1, wherein the communication request comprises at least one of a text message, a phone call, and a social media message.

4. The computer-implemented method of claim 1, wherein the IoT network contextual data comprises status data associated with the one or more IoT network devices for the user and historical usage data associated with the one or more IoT network devices.

5. The computer-implemented method of claim 1, wherein generating the response to the communication request comprises:
   analyzing the user context to determine an availability of the user when the communication request is received; and
   generating the response comprising an indication of the availability of the user and a time period for the sender of the communication request to send a second communication request.

6. The computer-implemented method of claim 1, wherein generating the response to the communication request comprises:
   analyzing the user context to determine an availability of the user when the communication request is received; and
   generating the response comprising an indication of the availability of the user and a time period the user will contact the sender of the communication request.

7. The computer-implemented method of claim 1, wherein the response to the communication comprises a text message transmitted to the sender of the communication request.

8. The computer-implemented method of claim 1, further comprising:
   displaying, on the user device, the response to the communication request;
   receiving an input from the user indicating an acceptance of the response;
   transmitting the response to the sender of the communication request; and
   storing the response in a user profile for the user.

9. The computer-implemented method of claim 8, wherein the generating the response to the communication request is further based on the user profile, wherein the user profile comprises historical responses to historical communication requests for the user.

10. The computer-implemented method of claim 1, further comprising:
    displaying, on the user device, the response to the communication request;
    receiving an input from the user indicating a change to the response;
    adjusting the response based on the input from the user;
    transmitting the response to the sender of the communication request; and
    storing the response and the change to the response in a user profile for the user.

11. The computer-implemented method of claim 1, further comprising:
    obtaining a user profile comprising historical user contexts associated with historical responses to historical communication request for the user;
    wherein determining the user context is based on a feature vector, generated by a machine learning model, the feature vector comprising a plurality of features extracted from the historical user contexts and historical responses.

12. The computer-implemented method of claim 1, wherein the IoT network contextual data comprises metadata associated with the one or more IoT network devices.

13. The computer-implemented method of claim 12, wherein the user context comprises a confidence score indicating a probability of the user interacting with at least one IoT network device of the one or more IoT network devices;

wherein generating the response is further based on the confidence score exceeding a threshold score.

14. A system for internet of things (IoT) network context dependent communication responses, the system comprising:
a processor communicatively coupled to a memory, the processor configured to:
receive a communication request for a user, the communication request comprising content, wherein the communication request for the user is received at a user device for the user;
determine an identity of a sender of the communication request;
analyze the content of the communication request to determine a sentiment or tone of the communication request;
determine a responsive sentiment or a responsive tone for a response to the communication request based on the determined sentiment or the determined tone and the identity of the sender;
identify one or more IoT network devices based on a proximity of the user device to the one or more IoT network devices;
obtain IoT network contextual data for the one or more IoT network devices, wherein the IoT network contextual data comprises IoT network historical pattern data metadata indicating one or more patterns of user interactions with the one or more IoT network devices;
determine a user context based at least in part on the one or more patterns of user interactions with the one or more IoT network devices, wherein determining the user context comprises:
generating a pattern score based on the IoT network historical pattern data; and
determining the user context based at least in part on the pattern score exceeding a threshold pattern score; and
generate the response to the communication request based on the identity of the sender and the user context by incorporating the responsive sentiment or the responsive tone into the response to the communication request.

15. The system of claim 14, wherein the processor is further configured to transmit the response to the sender of the communication request.

16. A computer program product for internet of things (IoT) network context dependent communication responses, the computer program product comprising a computer readable storage medium having program instructions embodied therewith, wherein the computer readable storage medium is not a transitory signal per se, the program instructions executable by a processor to cause the processor to perform a method comprising:
receiving, by a processor, a communication request for a user, the communication request comprising content, wherein the communication request for the user is received at a user device for the user;
determining an identity of a sender of the communication request;
analyzing the content of the communication request to determine a sentiment or tone of the communication request;
determining a responsive sentiment or a responsive tone for a response to the communication request based on the determined sentiment or the determined tone and the identity of the sender;
identifying one or more IoT network devices based on a proximity of the user device to the one or more IoT network devices;
obtaining IoT network contextual data for the one or more IoT network devices, wherein the IoT network contextual data comprises IoT network historical pattern data indicating one or more patterns of user interactions with the one or more IoT network devices;
determining a user context based at least in part on the one or more patterns of user interactions with the one or more IoT network devices, wherein determining the user context comprises:
generating a pattern score based on the IoT network historical pattern data; and
determining the user context based at least in part on the pattern score exceeding a threshold pattern score; and
generating the response to the communication request based on the identity of the sender and the user context by incorporating the responsive sentiment or the responsive tone into the response to the communication request.

17. The computer program product of claim 16 further comprising transmitting the response to the sender of the communication request.

* * * * *